March 21, 1961 K. YANUSH 2,975,480
APPARATUS FOR MAKING FELT BOOTS
Filed March 19, 1958 2 Sheets-Sheet 1

INVENTOR.
KONSTANT YANUSH,
BY
L. J. Larrabee
his ATTORNEY.

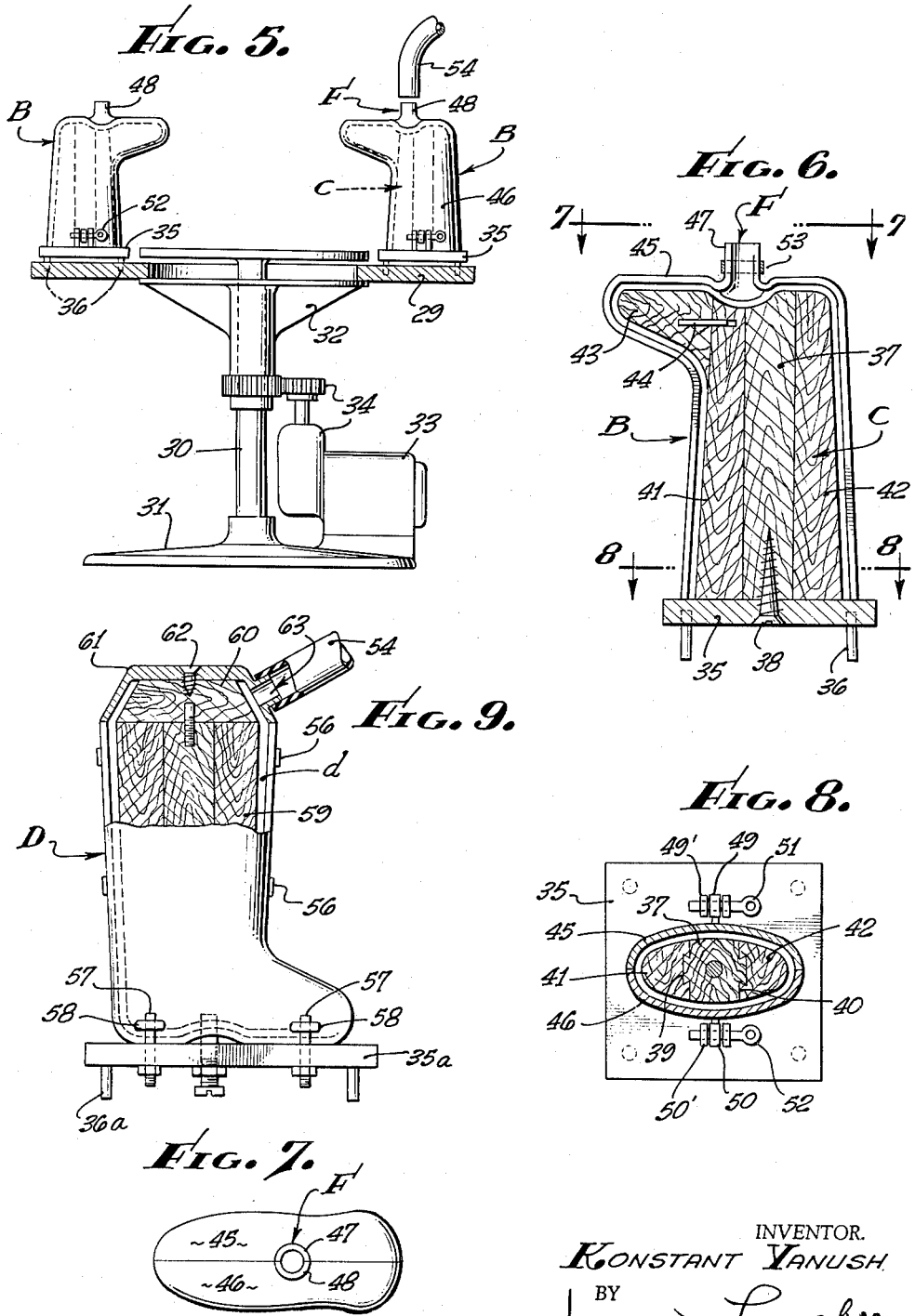

United States Patent Office

2,975,480
APPARATUS FOR MAKING FELT BOOTS

Konstant Yanush, 8722 E. Las Tunas Drive, San Gabriel, Calif.

Filed Mar. 19, 1958, Ser. No. 722,491

4 Claims. (Cl. 18—34)

This invention relates to a new and improved apparatus for making felt boots.

The apparatus consists in general of three principal mold elements, two outer generally cylindrical elements and an inner or "mandrel" element. All the mold elements are suitably mounted so that they are easily and quickly assembled and dismantled, and are also maintained in rigid position when in the assembled position. It is a feature of the mold elements that they may be assembled and disassembled easily and quickly in the setting up of the apparatus for making a boot, and in the dismantling of the apparatus to remove the finished boot.

An object of my invention is to provide a novel, simple and inexpensive apparatus for making felt boots.

Another object is to provide a novel apparatus whereby felt boots may be economically manufactured.

The invention resides in the parts and combination and arrangement of the parts as more fully hereinafter described in detail and defined in the claims.

Other objects, advantages and features of invention may appear from the accompanying drawings, the subjoined detail description, and the appended claims.

The accompanying drawings illustrate the invention in some of the forms I at present deem preferable.

Fig. 5 is an elevational view of a further modified form of mold set up for production of felt boots on an endless carrier, and for illustrative purposes, being shown as a rotatable table.

Fig. 6 is a central vertical section through one of the molds shown in Fig. 5.

Fig. 7 is a plan view of the mold, on a plane and looking in the direction of the arrows 7—7, Fig. 6, the base plate being omitted.

Fig. 8 is a sectional view on line 8—8, Fig. 6, to show an arrangement for maintaining the outer mold in spaced relation to the inner mold and secured to the base plate.

Fig. 9 is a side elevational view, partly in section, of a still further modified form of mold.

Figure 1:
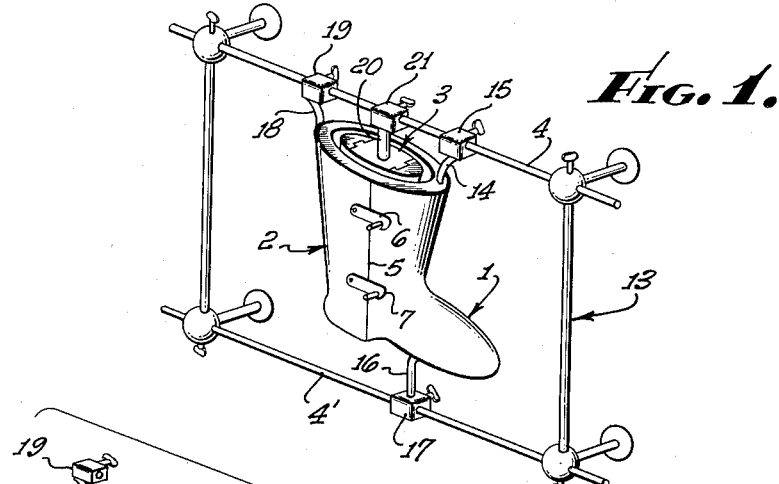
Figure 1 is a perspective oblique three-quarter view of one form of the apparatus as it is assembled to receive the felt suspension for the making of a felt boot.
Figure 2:
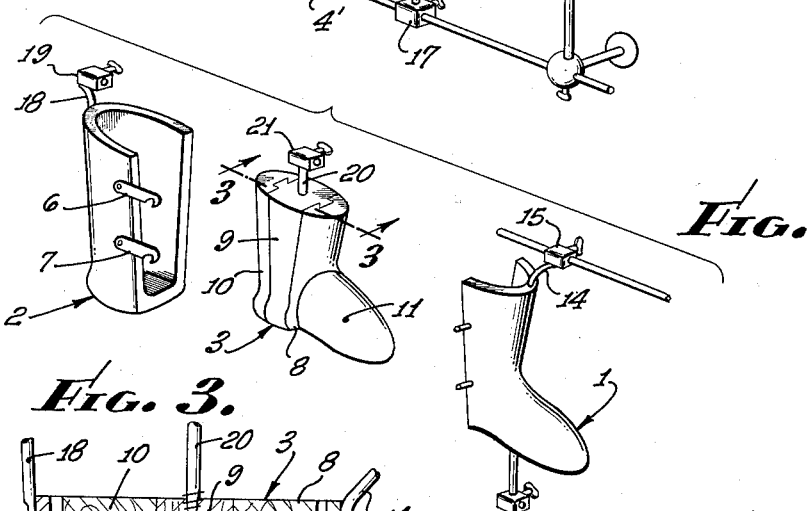
Fig. 2 is an "exploded" view generally similar to Figure 1, with the mold elements separated to more clearly disclose their construction.
Figure 3:
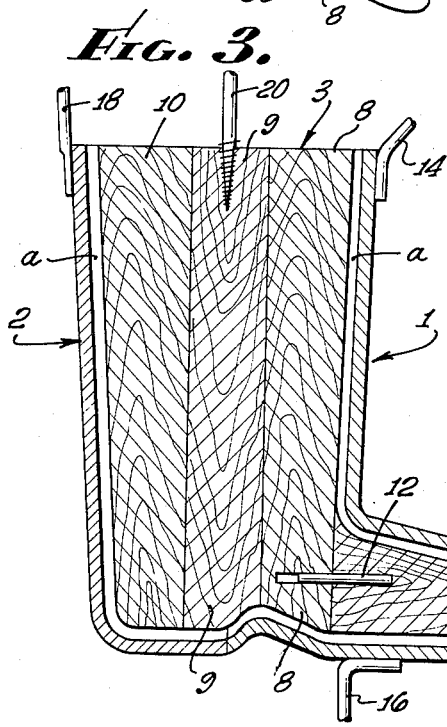
Fig. 3 is a cross-sectional view, on a larger scale, taken on line 3—3, Fig. 2, illustrating the construction of the apparatus in clearer detail.

Referring to the drawings (Figs. 1–3), the mold elements are generally indicated at 1, 2 and 3. These are denoted as an outer front or forward mold element 1, an outer rear mold element 2, and an inner or central mold element or mandrel 3. It will be apparent, however, that the apparatus could be divided as between one side and the other (as shown in Figs. 5–9 and as hereinafter described) rather than as between front and rear, as shown in Figs. 1–4.

The forward outer mold element 1 corresponds generally to the foot part of the boot. It will be seen that mold element 1 is generally U-shaped in transverse horizontal cross-section in its upper region, and in its lower region is of elongated hollow shape.

The rear mold element 2 has the same general shape at its upper region as outer mold element 1 and is closed at its lower region corresponding to the position of the heel of the boot.

Mold elements 1 and 2 fit together with a parting line at 5, and any suitable latching means, denoted by 6 and 7, are used to hold the outer mold elements 1 and 2 tightly together. If required, suitable additional latching means could be provided at the parting line 5 but with the construction disclosed herein it has generally not been found necessary, and additional latching means (not shown) analogous to means 6 and 7 may be used on the other side of mold elements 1 and 2 to securely hold the mold elements together.

The central or inner mold element 3 preferably consists of three elongate or longitudinal parts 8, 9 and 10, dovetailed together, and a toe portion 11 that is secured to part 8. Longitudinal parts 8, 9 and 10 are slidable with respect to each other for facilitating removal of the central mold element 3 from the finished boot, and toe portion 11 is removably attached to longitudinal part 8 by means of a dowel 12, see Fig. 3, and which may be permanently attached to toe portion 11 and may appropriately fit into a suitable opening in part 8.

It has been found satisfactory to provide the central mold element 3 as just described, but it will be realized that considerable variation is possible with regard to the attachment of toe portion 11 to longitudinal part 8.

Mold elements 1, 2 and 3 may be slidably attached to a framework denoted by 13 which is in turn rigidly attached to a wall or the like. Preferably the attachment of mold elements 1, 2 and 3 to frame 13 is such that said mold elements are slidable laterally on frame 13, but are otherwise rigid when assembled thereon. A bar 14 is attached to mold element 1, and bar 14 is in turn attached to a collar 15 which slides on rod 4 of frame 13. A similar bar and collar 16 and 17 respectively, are used at the lower end of mold element 1 for attachment to rod 4' of frame 13.

Similar bar and collar elements 18, 19 and 20, 21 are respectively used in conjunction with mold elements 2 and 3.

In general, the rigidity of the support of the mold elements will be ensured by the rigidity of the frame 13 and the collars 15, 17, 19 and 21 thereon. It is contemplated that the space $a$ between outer mold elements 1, 2 and inner mold element 3 will be filled by a suspension of felt particles in a volatile solvent, and which is allowed to harden. The felt suspension may be fed into the space $a$ between the inner and outer molds by any suitable means, such as with a gun, or it may be blown into such space $a$ if a suitable hood is provided around the apparatus.

It will be appreciated that some considerable rigidity of the mold parts is necessary, as otherwise when the felt suspension is forced in by a gun, mold element 3 may be distorted in space $a$ from its initial position, and the thickness of the resulting boot will not be uniform.

Figure 4:
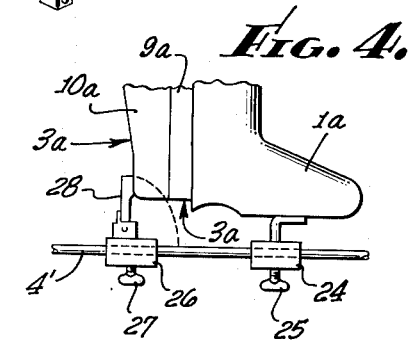
Fig. 4 shows a modified construction of mold support.

If there is a tendency toward this difficulty, the alternative construction shown in Figure 4 will correct this tendency. Figure 4 contemplates that the felt suspension will be fed in in two stages, firstly to the toe portion 1a with the rear mold element 2 out of the way, and then to the remainder of the mold space $a$ with the rear mold element 2 in place. The construction of Figure 4 permits filling of the toe portion so as to maintain uniform thickness.

In Figure 4 mold element 1a is provided with a collar 24, similar to collar 17 and provided with a clamp screw 25, and slidable on rod 4'. A similar collar 26 also slidable on rod 4' is provided for holding inner mold element 3a rigid with respect to mold element 1a, and collar 26 is also provided with a clamp screw 27. Pivotally attached to collar 26 is an upright bar 28 which is arranged so that it cannot be pivoted in a counter-clockwise direction (as seen in Fig. 4) beyond the vertical position shown.

It will be seen that with outer front mold element 1a held rigid by collars 15 and 24, inner mold elements 3a can be inserted in outer mold element 1a to a proper spaced position therein so that the felt will have the desired thickness, and inner mold 3a may be held from slipping in a left-hand direction in Fig. 4 by contact with bar 28 on clamping collar 26. The correct position of inner mold element 3a relative to outer mold element 1a could be set by means of a suitable reference mark (not shown) on inner mold element 3a. With said mold elements 1a and 3a held rigid with respect to each other, felt suspension can be pumped into the space a therebetween, by any suitable means, such as a gun, as aforesaid. The volatile solvent felt suspension will immediately begin to solidify and will act as a spacer for positioning the molds as in Figure 1.

The outer mold element for the back of the boot can then be locked against mold element 1a by swinging bar 28 clockwise to a horizontal position, positioning mold element 2, and securement of locking means similar to 6 and 7, and then the remainder of the space a is filled with felt suspension from the top, as aforesaid.

The steps where the toe portion is first filled with felt suspension has just been referred to, but this will not ordinarily be necessary if the collars 15 and 17, 19 and 21 shown in Fig. 1 fit snugly on frame 13.

Assuming the latter, apparatus is assembled as shown in Figure 1 and felt suspension is pumped into the open space a between the molds 1, 2 and 3 at the top thereof through a pipe line (not shown) until it completely fills the space a between outer mold elements 1, 2 and inner mold element 3. The flow of felt suspension is then discontinued.

After the space a between mold elements 1, 2 and inner mold element 3 has been filled with, and the felt suspension has set, the mold elements 1 and 2 are separated and the felt boot on inner mold element 3 is subjected to hand finishing which is fully understood in the art. The felt boot, still on inner mold element 3, is then subjected to further drying by warm air. When the drying is complete the inner mold element 3 is removed from the felt boot by pulling out parts 9 and 10 in that order, and then moving and disengaging part 8 from the felt boot. In the event such removal of part 8 leaves toe portion 11 in the boot during removal of part 8 therefrom, such toe portion 11 may be easily removed by hand.

The felt boot is then further finished by methods fully known in the art.

It will be realized that various alternatives are possible within the scope of the present invention. One alternative is to dispense with the framework 13 and mount all of mold elements 1, 2 and 3 on a metal plate or other suitable rigid body. In such a case the inner and outer mold elements would preferably be inverted with relation to their position as shown in Figure 1, with the upper edges abutting such plate and suitably clamped or bolted thereto.

With the alternative just described the felt suspension could be fed into space a through an opening in outer front mold element 1 of Fig. 1 at, for example, the region where bar 16 is shown joining outer front mold element 1. Where the felt suspension is fed in through an opening at the "foot" end of the apparatus, it will be found desirable to have one or more steadying pins passing through outer front mold element 1 and central inner mold element 3, and through outer rear mold element 2. Such pins would prevent distortion of central inner mold element 3 from its central position and could be withdrawn toward the end of the filling operation.

It has already been indicated that under some circumstances the felt suspension may be blown into the space a between the inner and outer mold elements. In such a case it is preferable if the apparatus be divided as between right and left outer mold elements rather than as between front and rear mold elements, as shown. The right and left outer mold elements could be mounted at the foot end in some detachably rigid manner and the central inner mold element 3 may be held in its central spaced position by a hood conveying the blown suspension into the space between the mold elements.

Modified forms of apparatus to exemplify and carry out the variants of the process above referred to are shown in Figs. 5 through 9.

In Figs. 5–8, the outer and inner mold elements, B and C, are shown mounted bottoms upward, on an endless carrier, shown for illustrative purposes as a circular table 29 mounted for rotation on a vertical column 30 extending vertically from a base plate 31. The table 29 is carried on a rotatable bracket 32 and is driven at a suitable speed by an electric motor 33 and reduction gearing 34.

Base plates 35 on which the molds B and C are mounted are furnished with depending pegs 36 (Fig. 6) engageable with holes in the carrier or table 35, thereby providing means for quickly attaching and detaching the plates 35 and molds B and C carried thereby, to and from, the endless carrier means 29.

The center member 37 of the inner mold C is securely mounted on the base plate 35 as by a screw 38. The member 37 is formed with front and back faces parallel to one another and the faces are provided with longitudinal dove-tail ridges 39 and 40 (Fig. 8).

The front member 41 of the inner mold C and the back member 42 are provided with dove-tailed grooves fitting snugly with the dove-tail ridges 39 and 40.

A toe portion 43 is mounted on the front member 41 by a peg 44 which enables it to be withdrawn from and mounted on the front member 41.

Since the lower ends of the inner mold member C rest upon the base plate 35 and are dove-tailed together, the inner mold C is firmly fixed in position, yet the front and back members 41, 42 may be slid vertically off the center member 37.

The outer mold member B, which may be made, for instance of an aluminum casting, comprises a right half 45 and a left half 46, looking in the direction of the arrow in Figure 8. The half sections 45, 46 are furnished with half pouring spouts 47 and 48 to form a unitary filling inlet F. The halves of the outer mold B may be tightly pressed together and properly located with respect to the inner mold C by any suitable means, for instance, as shown in Fig. 8, by brackets 49 and 50, projecting from the half molds 45, 46 and drilled to receive pins 51, 52 passing through alined holes in lugs 49', 50' secured to and extending upwardly from the base 35.

If required, a ring 53 may be slipped over the split filling inlet F to hold the upper ends of the half molds 45, 46 together.

A mix of felt and suitable adhesive to form a felt suspension can then be injected into the mold by means of a mixture filler tube 54 connected to inlet F, which in Fig. 5 is slipped over inlet F to form a tight connection therewith.

In producing felt boots by the appartaus shown in Figs. 5 through 8, a number of molds can be set up on the endless carrier or table 29 and brought under the filler tube 54 and such molds are allowed to remain on the endless carrier 29 for a suitable period of time for the felt suspension or mixture to set while the operator is filling successive molds on the carrier 29, or the filled molds may be lifted off the carrier and placed in a drying oven. Obviously a high output production line would be set up using a conveyor belt in place of tables, the belt carrying the molds through setting up stations, filling stations, drying stations and any other stations required, and the table 29, illustrative of an endless carrier, being the basis for such concept.

The method of removing the formed boots from the molds will be obvious to those skilled in the art.

The form of mold shown in Fig. 9 differs from the forms previously described in that the outer mold D is a two piece casting with the halves divided along a center line and latched together as indicated at 56.

The outer mold D is mounted in upright position on a base plate 35a by locating pins 57 projecting upwardly from the base 35a and passing into eyes 58 projecting from the sides of the halves of the outer mold.

The inner mold 59 may be formed as shown in Fig. 8 built up of center, back and front pieces connected together by a tongue and groove arrangement.

A cover block 60 is secured to the inner mold 59, and a metal cap 61 is attached to block 60 by a screw 62. Cap 61 rests on the top edge of the outer mold D and is provided with a spout 63 to which the filler tube 54 may be connected and a felt suspension mixture of felting fibers and adhesive may be injected into the space d between the inner and outer mold members.

The felt boot so molded is treated by the methods previously described.

It will be apparent that when molds B and C are used for various sizes of felt boots that the means 49' and 50' co-acting with base plate 35 may be used without change to adapt said means to various sizes of boot molds; and the only change required in the mold securing means will be to shorten or lengthen the brackets 49 and 50 so that the pin hole therein will aline with the pin holes in the lugs 49' and 50'.

Various apparatus for carrying out the method of my invention have been specifically described and shown in the drawings by way of illustration, but not as limitative of the invention, since various changes and modifications may be made therein without departing from the scope of the invention as defined by the appended claims.

I claim:

1. Apparatus for making felt boots comprising: an outer mold having two half boot sections; a supporting surface; a bar mounted on said supporting surface; brackets adjustably mounted on said bar to support said outer half boot sections open and up; an inner mold having a longitudinal center section; a bracket mounted on said bar and rigidly supporting said center section; a back section longitudinally slidably mounted on said center section; a front section longitudinally slidably mounted on said center section; a toe section mounted on said front section; and means for holding the outer mold sections together and in spaced relation around said inner mold.

2. In apparatus for making felt boots and which includes a carrier, the combination of: a supporting plate adapted to be detachably connected to said carrier; a two-piece outer mold including a first molding element having a boot-shaped concavity corresponding substantially to a first half of a boot, and a second molding element having a boot-shaped concavity corresponding substantially to a second half of the boot; latching means coupled to said outer mold for releasably pressing said first molding element and said second molding element closely together in registering abutting relationship and coupled to said supporting plate for releasably supporting said outer mold on said supporting plate at the normal top of the boot; means positioned at the top of said outer mold for defining a filler inlet at the normal bottom of the boot; an inner mandrel mold element having a rear portion, a central portion, a front portion, and a laterally detachable toe portion mounted on said front portion, and which portions in assembled relationship with one another have an external surface corresponding to the interior of the boot, said front and central and rear portions of said inner mandrel mold having a dovetail configuration for mutually supporting one another in longitudinal sliding relationship with respect to one another; means for affixing said center portion of said mandrel mold on said supporting plate to support said mandrel mold within said first and second molding elements of said outer mold with the outer surface of the inner mandrel mold displaced from the inner surface of said outer mold a distance substantially equivalent to the thickness of the boot.

3. In apparatus for making felt boots, the combination of: a first molding element having a boot-shaped concavity corresponding to substantially a first half of the boot; a second molding element having a boot-shaped concavity corresponding to substantially a second half of the boot; latching means coupled to said outer mold for releasably pressing said first molding element and said second molding element closely together in registering abutting relationship; an inner mandrel mold element having a rear portion, a central portion, a front portion, and a laterally detachable toe portion mounted on said front portion, and which portions when in assembled relation with one another have an external surface corresponding to the interior of the boot; said front and central and rear portions of said mandrel mold element having a dovetail configuration for mutually supporting one another in longitudinally sliding relationship with respect to one another; means affixed to at least one of said portions of said mandrel mold for supporting said mandrel mold in fixed spatial relationship with and extending entirely around the concavity in the first and second molding elements and displaced from the inner surface of said first and second molding elements a distance substantially equivalent to the thickness of the boot to be made; said front and toe portions of said mandrel mold element being so constructed and arranged whereby when said front and toe portions are placed in nesting relationship with said first molding element the space around said toe portion may be filled with a suspension of felt particles, and said second molding element serving to complete the interstice between said first and second molding elements and said mandrel to mold element and adapted to receive additional and like suspensions of felt particles to complete the boot.

4. In apparatus for making boots, and which includes a carrier, the combination of: a supporting plate adapted to be detachably connected to said carrier; a two-piece outer full-length mold including a first molding element having a boot-shaped concavity corresponding substantially to a first half of a boot and a second molding element having a boot-shaped concavity corresponding substantially to a second half of the boot; latching means coupled to said outer mold and to said supporting plate for releasably supporting said outer mold on said supporting plate so as to maintain said outer mold in an upright position on said plate; a cap resting upon and closing the upper edge of said outer mold; an inner mandrel mold element having a rear portion, a central portion, a front portion, and a detachable toe portion mounted on said front portion, and which portions when in assembled relationship with each other have an external surface corresponding to the interior of the boot, said front and central and rear portions of said inner mandrel mold having a dovetail configuration for mutually supporting one another in longitudinally sliding relationship with respect to one another; means for securing the central portion of said inner mold to the under side of said cap in depending relationship into the outer mold; said inner mandrel mold element when nested within said outer mold forming a space between the inner and outer molds; and means for forming a spout projecting from said cap for the introduction of a mix of fibrous material into the space between said inner and outer molds.

References Cited in the file of this patent

UNITED STATES PATENTS

| | | |
|---|---|---|
| 128,176 | Seibert | June 18, 1872 |
| 945,537 | Hoffmann | Jan. 4, 1910 |
| 1,175,428 | Freeman | Mar. 14, 1916 |
| 1,409,113 | Kramer | Mar. 7, 1922 |
| 2,040,921 | Corbin | May 19, 1936 |
| 2,209,877 | Ferngren | July 30, 1940 |
| 2,405,329 | Ruebensaal | Aug. 6, 1946 |
| 2,607,978 | Ward | Aug. 26, 1952 |
| 2,611,926 | Grannis | Sept. 30, 1952 |
| 2,756,479 | Garneau | July 31, 1956 |
| 2,834,986 | Bailey et al. | May 20, 1958 |

FOREIGN PATENTS

| | | |
|---|---|---|
| 684,738 | France | Mar. 24, 1930 |
| 1,080,648 | France | June 2, 1954 |
| 2,100,956 | France | Apr. 13, 1955 |